June 19, 1928.　　　　　D. C. DAVIS　　　　　1,673,937

BLADE LASHING

Filed Feb. 26, 1926

WITNESSES:

D. C. Davis
INVENTOR

BY
ATTORNEY

Patented June 19, 1928.

1,673,937

UNITED STATES PATENT OFFICE.

DAVID C. DAVIS, OF MONTCLAIR, NEW JERSEY, ASSIGNOR TO WESTINGHOUSE ELECTRIC & MANUFACTURING COMPANY, A CORPORATION OF PENNSYLVANIA.

BLADE LASHING.

Application filed February 26, 1926. Serial No. 90,846.

My invention relates to elastic fluid turbines, more particularly to the blading thereof, and has for its object the provision of an improved lashing means for turbine blades which shall be effective to minimize vibration thereof and which shall be simple and easy of application.

A particular object of my invention is to provide a turbine blade lashing which shall be retained in place by fused metal means and which shall involve the application of a minimum of heat to the blades, in the process of application.

A further object of my invention is to provide a turbine blade lashing secured in place by fusion of metal and which shall utilize equal amounts of soldering or brazing material on each blade in the process of application.

Figure 1:
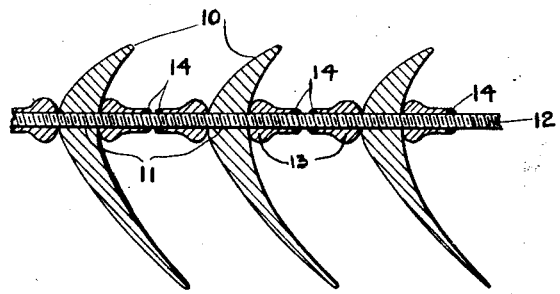
Figure 4:
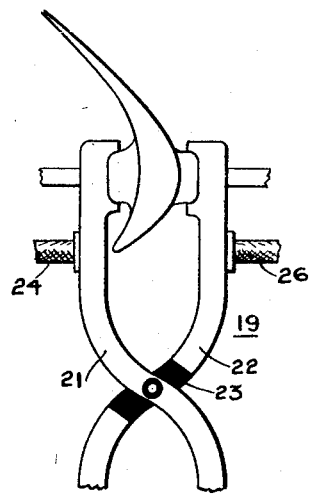
Figure 2:
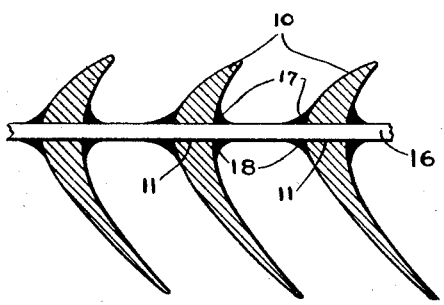
Figure 3:
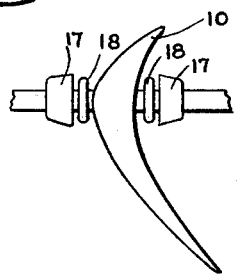

Apparatus embodying features of my invention is illustrated in the accompanying drawings forming a part of this specification, in which Fig. 1 is a sectional plan view of a partial row of turbine blades having my improved lashing means applied thereto; Fig. 2 is a view similar to Fig. 1 and showing another form of my invention; Fig. 3 is a plan view of a blade showing a step in the process of securing the lashing to the blades; and Fig. 4 is a view showing the final step in the process of application.

Turbine blade lashing, as known to me, has heretofore been in the form of a wire inserted in a series of holes or recesses in the blades and secured thereto by fusion of metal, such as soldering or brazing, or by distortion of the metal of the lashing on each side of the blade. Sometimes a combination of the two methods has been employed in order to securely fasten the lashing to the blades.

Due to the temperatures ordinarily obtaining in a turbine and the stresses to which the blades and lashing are subjected in operation, the process of securing the lashing to the blades by fusion of metal has involved the employment of a soldering or brazing flux having a much higher melting point than materials commonly used in the arts for the same purpose, the solder usually employed being silver. Due to the high melting point of silver solder, the ordinary method of soldering by means of a heated tool applied to the solder could not be employed and it has been necessary to heat the blade, the lashing wire and the solder, usually by means of a gas flame, until the solder would run and join the blade and the wire together.

The method of soldering just described, while effective for securing the lashing wire to the blades, is open to the serious objection that the blade is heated in the process over a relatively wide area and the heating of the blade has been found to have a deleterious effect on its physical properties, leading at times to its breakage in service. Another difficulty encountered has been that the solder employed is relatively expensive and when it is melted and begins to run a considerable amount is spilled and wasted. Furthermore, the method does not ensure the employment of the same amount of solder on each blade and the uneven distribution of the weight thereof around the turbine rotor tends to unbalance the later.

Where lashing wire has been secured to the blades by distortion of the metal of the wire on each side of a blade, difficulties have been encountered in securing a sufficient bearing surface for the distorted metal against the blade to effect a permanent juncture between the wire and the blade. This difficulty has led to the employment of a combination of distortion of metal and soldering. This latter method, however, is subject to the same difficulties in soldering already pointed out.

These and other difficulties are overcome in accordance with my invention by providing retaining members at each side of a turbine blade and by securing the retaining members either to the lashing wire or by securing the lashing wire, the retaining members and the blade together by fusion of metal produced by the passage of an electric current through the wire, the blade and the retaining members. The retaining members are formed in the shape of cup like rings, which may easily be formed by a stamping process well understood in the art, and are threaded on to the lashing wire when the blades are being assembled. Associated with each of the cup like rings and its associated blade is a ring of high-fusing solder which is also threaded on to the lashing wire when assembling the blades. After assembly, the rings on each side of a blade are clasped by a suitable electric welding tool and the current applied. Upon application of the current the rings are securely fastened to the wire or, as is shown in one form of my invention, the rings, the wire and the blades are all joined together by the solder. This is accomplished by the application of heat over a relatively small area of the blade and the physical properties of the blade are only slightly affected. Furthermore, no solder or spelter is wasted and an even amount is applied to each blade.

Referring now to the drawing for a better understanding of my invention, I show in Fig. 1 a partial row of turbine blades 10—10 having a series of holes 11—11 formed therein. Inserted in the holes 11—11 is a lashing wire 12. As shown in this modification of my invention the lashing wire 12 is threaded and, when assembling the blades a retaining member 13—13 is screwed on to the lashing wire at each side of a blade when the wire is inserted. Associated with each of the retaining members 13 is a ring of solder or spelter 14. After the blades 11—11, the wire 12, the retaining members 13—13 and the solder rings 14—14 are all assembled the rings are clasped by a suitable welding tool, to be described later, the whole is squeezed together and the current applied. The passage of the electric current through the structure creates heat which melts the solder and firmly secures the retaining members 13—13 to the lashing wire. In accordance with this method of carrying out my invention, the greatest application of heat occurs where the rings 14—14 surround the lashing wire 12 and is thus remote from the blade surface. Furthermore the retaining members 13—13 provide a relatively wide area bearing against the blade surface in order to hold the wire 12 in place.

Referring now to Figs. 2, 3 and 4 I show another form of my invention. In accordance with this modification a smooth lashing wire 16 is employed and is threaded through the holes 11—11. Fitting over the lashing wire 16 on each side of a blade 10 is a cup shaped retaining ring 17. Between each retaining member 17 and its associated blade is a ring of silver solder or brazing spelter 18. After the blades 10—10, the wire 16, the retaining members 17—17 and solder or spelter rings 18—18 are all assembled, the retaining members 17—17 on each side of a blade are clasped by a suitable welding tool 19 (Fig. 4), are pressed firmly against the blade and the current applied as previously described in connection with Fig. 1.

The welding tool 19 shown in Fig. 4 is of a well known form and embodies two jaws 21 and 22 formed to accommodate the retaining members 17 and are insulated from each other as shown at 23. Electric leads for the two jaws are indicated at 24 and 26. With this form of welding tool, when the current is applied, it will be seen that it passes from one of the jaws 21 or 22 to the other through the retaining members 17—17, the blade 10 and the spelter or solder rings 18—18. The passage of the current produces heat, melts the solder or spelter rings 18—18 and firmly joins the wire 16, the retaining members 17—17 and the blade 10 together. Not only is the solder retained in place by the cup members 17—17 so that it is in position to penetrate between the blade and the lashing wire but the cup member itself is firmly soldered to the lashing wire and forms an effective fastening adjunct.

From the foregoing it will be apparent that I have devised an improved lashing means for turbine blades wherein the lashing is securely fastened in place by fusion of metal and wherein a minimum of heat is employed in the process.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. In a turbine, a blade having a recess, a lashing member in the recess, a retaining member associated with the lashing member at each side of the blade and abutting against one face of the blade, and means joining the retaining members to the lashing member.

2. In a turbine, a blade having a recess, a lashing wire in the recess, a retaining member on the wire at each side of the blade and abutting against one face of the blade, and means joining together the retaining members, the wire and the blade.

3. In a turbine, a blade having a recess, a lashing wire in the recess, a retaining member on the wire at each side of the blade and abutting against one face of the blade, and fused metal means for joining the blade, the wire and the retaining members together.

4. In a turbine, the combination of a blade having a hole therein, a lashing wire inserted in the hole, cup shaped retaining rings surrounding the wire on each side of the blade and having the open ends thereof bearing against the blade, spelter rings surrounding the wire and disposed within the cup portions of the retaining rings, and fused metal means joining the retaining rings to the wire.

5. In a turbine, the combination of a blade having a hole therein, a lashing wire inserted in the hole, cup shaped retaining rings surrounding the wire on each side of the blade and having the open ends thereof bearing against the blade, solder rings surrounding the wire and disposed within the cup portion of the rings and joining the rings to the wire, the wire to the blade and the rings to the blade.

6. In a turbine, a blade having a recess, a lashing member in the recess, a retaining member associated with the lashing member at each side of the blade and abutting against a face of the blade, and fused metal means joining the retaining members to the lashing member.

7. In a turbine, a row of blades having a series of holes formed therein for the insertion of a lashing wire, a lashing wire inserted in the holes, and retaining members for the lashing wire provided at both sides of each of the blades and abutting the faces of each blade and secured to the lashing wire by fusion of metal.

In testimony whereof, I have hereunto subscribed my name this 11th day of Feb. 1926.

DAVID C. DAVIS.